Patented Dec. 31, 1940

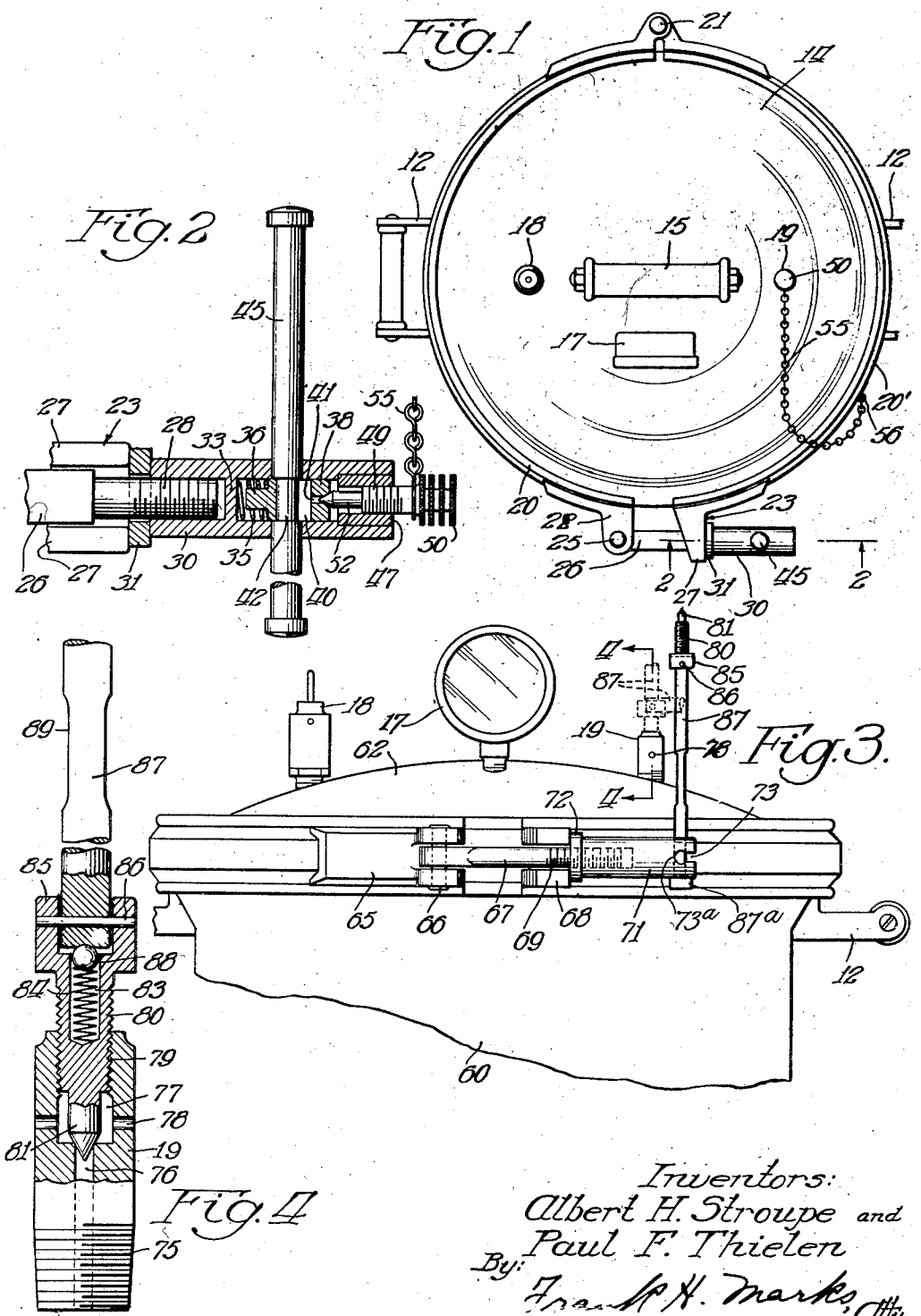

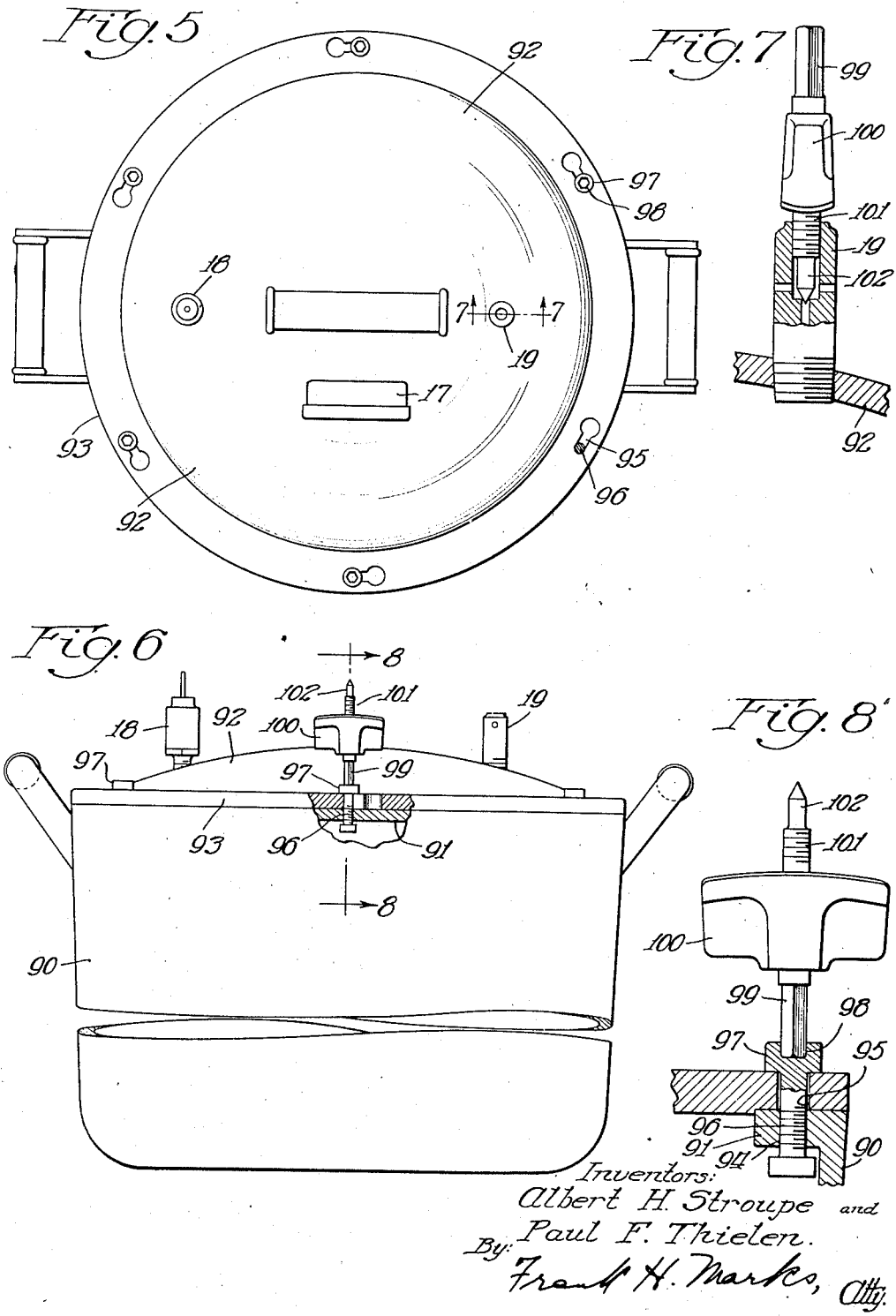

2,226,593

UNITED STATES PATENT OFFICE 2,226,593

PRESSURE COOKER

Albert H. Stroupe and Paul F. Thielen, Peoria, Ill.

Application January 11, 1937, Serial No. 119,896

5 Claims. (Cl. 220—55)

Our invention relates to pressure cookers and has to do more particularly with a safety cooker which will render impossible the injury of an operator by scalding.

As is well known, pressure cookers operate under excessive temperatures and pressure of steam. It is customary for such devices to be provided with covers which are tightly clamped to the body portion of the cooker during the cooking operation, and after such operation it is usual first to release the pressure within the cooker by means of a valve provided therefor and then to open the device by unclamping the lid. As it is common for these articles to be used by housewives and other persons unskilled in mechanical devices, it is not uncommon that the operator forgets to release the valve at the conclusion of the cooking period and directly unclamps the lid while the interior of the cooker is at a high pressure and temperature, resulting in severe scalding.

It is accordingly an object of our invention to provide a pressure cooker with means cooperating with both the blow-off valve and the clamping mechanism, whereby said valve must first be released before the lid can be unclamped, thus preventing injury to the operator and rendering the device substantially foolproof.

A further object is to provide a device of the type referred to which will be simple and inexpensive in construction and easy to operate.

Various other objects and advantages will become apparent to those skilled in the art as the description proceeds.

Referring now to the drawing forming a part of this specification and illustrating certain preferred embodiments of our invention:

Fig. 1 is a top plan view of a cooker embodying our invention;

Fig. 2 is a plan view partly in section, showing certain details of our invention;

Fig. 3 is a fragmentary elevational view of the upper portion of a cooker embodying a modified form of our invention;

Fig. 4 is a sectional view taken substantially on the line 4—4 of Fig. 3;

Fig. 5 is a top plan view of another embodiment of our invention;

Fig. 6 is a side elevation of the same;

Fig. 7 is a sectional view taken along the line 7—7 of Fig. 5; and

Fig. 8 is a sectional view taken along the line 8—8 of Fig. 6.

Referring first to Figs. 1 and 2, the cooker body (not seen) is provided with handles 12 and a cover 14, the latter having a handle 15. In the cover is arranged a steam pressure gage 17, a safety valve 18 of usual or any suitable construction, and a blow-off valve 19.

There is provided a pair of semi-circular clamping members 20—20' hinged together as at 21 adjacent the rear of the cooker and, adjacent the front portion thereof, provided with outstanding lugs or ears 22, 23. As will be understood by those familiar with this art, the clamping ring segments 20, 20' engage marginal flanges on the lid and body portion of the cooker respectively, so as to clamp them firmly into steam tight engagement. Pivotally secured to the lug 22 as at 25 is a lock bar 26 which engages in the lug 23, which is bifurcated as shown clearly in Fig. 2, having parallel fingers 27, 27. The lock bar 26 has secured thereto a threaded stud 28 on which is threadedly arranged a sleeve 30, a washer or the like 31 being disposed between sleeve 30 and the bifurcated lug 23. As seen clearly in Fig. 2, a transverse wall 33 is provided in the sleeve 30 and seated against this wall within the sleeve 30 is a compression helical spring 35. Disposed within this helical spring is a reduced portion 36 of a cylindrical plug 38, this plug having a transverse cylindrical cavity 40 and an axial aperture 41. This cavity 40 normally seats a reduced portion 42 of a crank member 45. The diameter of the cavity 40 is such that it will slidably accommodate the larger portion of the crank 45, but due to the expansive effect of the spring 35 against the plug 38, the crank 45 is normally locked in the position shown in Fig. 2 so that it is incapable of sliding relative to the sleeve 30.

The free end of the sleeve 30 is provided with a threaded bushing 47.

There is provided a screw member 49 engageable with the threaded bushing 47 and having a knurled head 50 at one end and at the other end a pointed stud portion 52 seatable in the aperture 41. The screw 49 is also engageable in the threaded opening (not shown in detail) provided for the blow-off valve 19 and a chain 55 or other suitable attaching means attaches the member 49 to the cooker body as indicated at 56, or at some other suitable point.

In the operation of the device, the screw 49 is normally disposed in cooperative relation with the blow-off valve 19 during the cooking operation, the stud portion 52 closing the valve so as to maintain a cooking pressure within the body of the cooker. At the conclusion of the cooking period, the screw 49 is removed from the valve 19, thus releasing the pressure within the cooker, so that it is safe to remove the lid, and is then screwed into the bushing 47. By screwing the member 49 slightly beyond the point shown in Fig. 2, it will be apparent that the plug 38 will be forced, against the action of the spring 35, to a position where the transverse aperture 40 will be in substantial registry with the major diameter of the crank 45, thus permitting this crank to slide relative to the sleeve 30. Until this point is reached it will be obvious that the crank 45 is capable only of approximately a half revolution and thus the sleeve 30 cannot be sufficiently turned to release it or the washer 31 from clamping engagement with the bifurcated lug 23. However, after the plug 38 has been moved to a point where the crank 45 can slide relative to the sleeve 30, it will be apparent that the sleeve can be released from clamping relation to the bifurcated lug 23 by alternately turning the crank 45 a half revolution and sliding it out its full length so that its rotation can be repeated.

Referring to the embodiment shown in Figs. 3 and 4, which is slightly different in construction but substantially similar in principle to the embodiment of Figs. 1 and 2, the lid 62 is clamped to the cooker body 60 by a substantially similar arrangement of hinged ring segments as shown in the other embodiment, one of these ring segments being provided with a lug 65 pivotally securing as at 66 a lock bar 67, the other segment being provided with a bifurcated lug 68 seating the lock bar 67.

The bar 67 is likewise provided with a threaded portion 69 which engages a clamping sleeve 71 having a collar 72 normally engaging the bifurcated lug 68 and at its other end being provided with diametrically opposed slots 73.

The blow-off valve 19 as shown clearly in Fig. 4 is threaded as at 75 to seat in a threaded aperture provided in the cooker lid. This valve has an axial cavity 76 leading to an enlarged chamber 77 which is provided with transverse orifices 78 and has a threaded portion 79. It will be understood that this valve construction is applicable to the various embodiments of our invention.

Engageable in the threaded portion 79 of the valve is a screw plug 80 having a reduced pointed portion 81 seating in the upper end of the axial channel 76. The screw portion 80 is also provided with an axial bore 83 seating a helical compression spring 84 and integral with the screw 80 is an enlarged head 85 having opposed slots or openings. Hingedly secured to the portion 85 as by means of a pin 86 is a crank bar 87, a ball bearing 88 being pressed against an extremity of the bar 87 by the spring 84. This bar is provided with a reduced portion 89 of such size as to be readily insertible into the opposed slots 73 of the sleeve 71, while the major portion of the crank 87 is too large in diameter to be so insertible.

The operation of this embodiment of our invention is as follows: During the cooking period the plug 80 is engaged in the valve member as shown in Fig. 4, so that said valve is closed, preventing escape of steam from the interior of the cooker, while the clamping sleeve 71, of course, tightly engages the bifurcated lug 68. At the conclusion of the cooking operation the crank 87, which is normally held erect in a readily accessible position by means of the spring 83, is bent to a position at right angles to the axis of the plug 80 and the plug 80 is unscrewed from the valve, thus releasing the steam pressure within the cooker. The reduced portion 89 of the crank 87 is then inserted within the slots 73 of sleeve 71, with the head 87ª lowermost, and, when the portion 89 is within the enlargements 73ª of said slots, the crank is raised until its head 87 substantially engages the bottom of the sleeve, as shown in Fig. 3, so as to be able to pass between the sleeve and the adjacent clamping segment. The crank may then be turned, releasing the sleeve 71 from clamping engagement with the bifurcated lug 68, the crank being alternately turned a half revolution, raised to register the reduced portion 89 with the opposed slots 73, slit out, reinserted as before, and given another half revolution, and this action repeated until the lid is released and may be removed. To tighten the lid in place, the same procedure is followed, with the head 87ª uppermost at the beginning of each half revolution.

Referring to Figs. 5 to 8, inclusive, the pot 90 has an inwardly extending flange 91 and the lid 92 has a similar flange 93 attached to overlap the flange 91 in sealing relation thereto. The flange 91 is provided with a plurality of spaced circular perforations 94 while the flange 93 is provided with similarly spaced perforations 95 of keyhole shape.

Extending through perforations 94 and 95 are double headed screws 96, the upper head 97 being provided with a polygonal socket 98, as in the form of a hexagon, to receive a tool, as, for example, the wrench 99.

As seen clearly in Fig. 8, the wrench 99 is carried by a handle member 100, which may be of molded material, said wrench extending therethrough and at its opposite end having a male threaded portion 101 and terminating in a reduced stud 102.

In the operation of this embodiment of our invention, the screw heads 97 are tightened down on the flange 93 by means of the tool 99, which is applied in the manner shown in Figs. 6 and 8, thus clamping the lid into sealing relation with the pot. The tool is then reversed and the threaded member 101 is screwed into the blow-off valve 19 (Fig. 7) until the stud portion 102 completely closes the valve. The device is then ready for cooking, after which the valve is opened, letting off the steam. The tool 99 is then applied to the socket members 97 and the screws 96 rotated until the cover is loose. The cover may then be rotated until the upper heads 97 are aligned with the enlarged portions of the keyhole slots 95, whereupon the cover may be removed.

Various other changes and modifications coming within the spirit of our invention may suggest themselves to those skilled in the art, and hence we do not wish to be restricted to the specific embodiments shown or uses mentioned, except to the extent indicated in the appended claims, which are to be interpreted as broadly as the state of the art will permit.

We claim:

1. In combination with pressure cooker body and lid members, one of which has an open blow-off valve, key-controlled means for clamping said members together, key means for controlling said key-controlled means, and closure means for said valve, said key means and said closure means being connected as a unit, said valve and key-controlled means being disposed in such relation that said key-controlled means is releasable by said key means only when said valve is not closed by said closure means.

2. In combination with pressure cooker body and lid portions, means for clamping the lid portion to the body portion, and an open blow-off valve, a valve closure cooperable selectively with said clamping means and valve and operative for controlling the entire clamping means only when said valve is not closed by said closure, and for closing said valve when not controlling said clamping means.

3. In combination with pressure cooker body and lid portions, means for clamping said lid portion to said body portion, and an open blow-off valve, a member independent of said clamping means and including a closure for said valve, said member being separable from said valve and cooperative with said clamping means for releasing said clamping means, said valve and clamping means being in such spaced relation to each other that said releasing means is not available to release said clamping means when said releasing means closes said valve.

4. In combination with pressure cooker body and lid portions, means for clamping the lid portion to the body portion, and an open blow-off valve independent of said clamping means, means cooperative with one of said portions for preventing release of said clamping means and shiftable by hand to permit release of said clamping means, means for preventing the second means from being so shifted, and means including a valve closure and operative selectively to close said valve or to render the third means inoperative so that said clamping means cannot be released by said closure while said valve is closed by said closure.

5. In combination with pressure cooker body and lid portions, means for clamping the lid portion to the body portion, and an open blow-off valve in said lid, a detachable plug member for closing said valve, said clamping means comprising a rotatable element having screw-threaded engagement with a cooperating element to clamp the lid and body together upon rotation of the rotatable element in one direction and to release the lid from clamping engagement with the body upon rotating the rotatable element in the opposite direction, and means for rotating said rotatable element comprising an integral portion of said detachable plug member whereby the rotatable element can only be rotated when the plug member is detached from the blow-off valve.

ALBERT H. STROUPE.
PAUL F. THIELEN.